(12) United States Patent
Mattes et al.

(10) Patent No.: US 6,380,842 B1
(45) Date of Patent: *Apr. 30, 2002

(54) ELECTRONIC KEY

(75) Inventors: Johannes Mattes, Fridingen; Karl Müller, Rottweil-Neufra, both of (DE)

(73) Assignee: Marquardt GmbH, Rietheim-Wilheim (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/099,213

(22) Filed: Jun. 18, 1998

(30) Foreign Application Priority Data

Jun. 18, 1997 (DE) .......................................... 197 25 667

(51) Int. Cl.$^7$ ............................................... G05B 19/00

(52) U.S. Cl. ................................. 340/5.25; 340/825.69; 340/5.72; 340/5.6; 340/5.61; 340/5.25; 307/10.2; 701/36

(58) Field of Search ........................ 340/825.31, 825.34, 340/825.72, 460, 5.72, 825.69, 5.6, 5.61, 5.25; 701/36; 307/10.2

(56) References Cited

U.S. PATENT DOCUMENTS

| | | | |
|---|---|---|---|
| 4,786,900 A | | 11/1988 | Karasawa et al. |
| 4,881,148 A | * | 11/1989 | Lambropoulos et al. ... 307/10.2 |
| 4,926,332 A | * | 5/1990 | Komuro et al. ............... 701/36 |
| 5,134,392 A | * | 7/1992 | Takeuchi et al. ....... 340/825.69 |
| 5,140,317 A | * | 8/1992 | Hyatt, Jr. et al. ....... 340/825.31 |
| 5,278,547 A | * | 1/1994 | Suman et al. .......... 340/825.32 |

FOREIGN PATENT DOCUMENTS

| | | |
|---|---|---|
| DE | 2906665 | 8/1980 |
| DE | 3503933 | 8/1986 |
| DE | 4117721 | 7/1992 |
| DE | 4242241 | 6/1994 |
| DE | 4418069 | 8/1995 |
| DE | 19511386 | 5/1996 |
| DE | 19513498 | 6/1996 |
| DE | 19505190 A1 | 8/1996 |
| DE | 19522940 | 1/1997 |
| EP | 0 501 715 | 2/1992 |
| EP | 0601771 | 6/1994 |
| GB | 2261254 | 5/1993 |
| WO | 86/00108 | 1/1986 |
| WO | 95 02702 | 2/1992 |

* cited by examiner

*Primary Examiner*—Michael Horabik
*Assistant Examiner*—Yves Dalencourt
(74) *Attorney, Agent, or Firm*—Venable; Robert Kinberg

(57) ABSTRACT

An electronic key for use with a vehicle locking system controls at least one of a door locking feature and an ignition lock feature on the vehicle. The electronic key has a transmitter/receiver for transmitting at least one coded operating signal generated by the electronic key and transmitted from the electronic key to the locking system to activate at least one function of the locking system upon positive evaluation of the transmitted operating signal by the locking system. Actuating members are provided on the key and operated by the user to cause the transmitter/receiver to transmit the coded operating signal, and the activating elements are also adapted for the user to enter an individual code. A circuit is provided for receiving the entered individual code and comparing it with a programmed individual code and, upon entry of the programmed individual code being detected, changing the key over from a first, activated state in which transmission of the coded operating signal is prevented to a second, inactivated state in which transmission of the coded operating signal is permitted.

18 Claims, 3 Drawing Sheets

ELECTRONIC KEY

FIELD OF INVENTION

BACKGROUND OF THE INVENTION

The invention relates to an electronic key.

Electronic keys serve for actuating a locking system. This may be, in particular, a door locking and/or ignition lock system on an automobile.

An electronic key of this type is known from German Patent Document No. DE-A-195 05 190. The electronic key possesses means for the intended operation, such as a transmitter and, if appropriate, a receiver. With the aid of these means, at least one coded operating signal can be transmitted between the electronic key and the locking system. If the subsequent evaluation of the transmitted operating signal is positive, meaning that the electronic key belonging to the locking system is being used, corresponding functions of the locking system are actuated. These functions may be access authorization by virtue of the locking or unlocking of the automobile doors or an immobilization by virtue of the releasing of the engine control via the ignition lock or the like.

Modern electronic keys use, for the operating signal, high-level codes, for example a hash code, which are secure and insurmountable. If the key is misappropriated, however, the automobile can nevertheless be stolen. So-called "carjacking", in which the automobile together with the associated key is taken away from the driver by force, is also increasingly occurring. Costly antitheft systems therefore additionally use a satellite-assisted GPS (Global Position System) system with a telephone connection from the automobile to a control center, so that, under certain circumstances, the stolen vehicle can thereby be located after the theft.

An object of which the invention is to develop further the known electronic key, in such a way that the actuation of the locking system can be prevented, even without costly additional systems, if the associated key is misappropriated.

In the invention, the key can be programmed with an additional individual code. The key can be put into an activated state, in which the intended use of the key is blocked. A misappropriated key consequently cannot be used by the thief. Only if the correct individual code is entered does the key then change over again to the inactivated state, in which the key can be used as intended.

The programming of a new individual code can be carried out during the transition from the inactivated to the activated state. Likewise, during this transition, the reactivation of an already programmed individual code may also take place. The individual code is entered by means of the actuating members located on the housing of the key and serving for triggering the transmission of the coded operating signal, for example by means of the locking button for locking the automobile doors, the opening button for unlocking the automobile doors and the trunk button for opening the trunk lid. At the same time, in the case of individual code consisting of a numeric code, the actuating members are assigned corresponding digits in the numeric code and the number of actuations of the associated actuating member codes the respective digit. Expediently, a delay time is provided for clearing the actuating members in order to enter the individual code after the command to change over between the activated and inactivated state has been triggered, and the expiry of the delay time may be indicated, for example by a lighting means on the housing of the key.

The changeover between the activated and inactivated state may be triggerable by means of one of the actuating members, preferably the locking button being used to change over to the activated state and the opening button being used to change over to the inactivated state. An additional actuating member, in particular a button, for triggering the command to change over between the activated and inactivated state may likewise be arranged on the housing.

The reactivation of an already programmed individual code may likewise be carried out by the repeated interrupted actuation of the one of the actuation members, for example by pressing the locking button three separate times. When the automobile is in the driving mode, reactivation may also be carried out by the protracted actuation of any desired actuating member, so that the key, after being extracted from the ignition lock, cannot be used without knowledge of the individual code. If an automobile which has stopped is attacked, the thief then only takes away an automobile which can subsequently no longer be put into operation. In order to prevent the individual code from being discovered by trial and error, an antiplay device may be provided by a permanent changeover to the activated state, with the coded operating signal being blocked, when the wrong individual code is entered several times. It is then possible for the blocked state to be deactivated only in the workshop by resetting the key by means of a special code which is related to the respective key or the automobile.

The key may possess an indicator in order to display the changeover to the activated and/or inactivated state. This indicator may take the form, for example, of a lighting means flashing for a specific timespan at high frequency on the housing of the key, flashing taking place when an actuating member on the key is actuated in the activated state. It is likewise possible that, when the actuating member is actuated, a light emitting diode on the housing lights up red in the activated state of the key and green in the inactivated state. The battery check light on the housing of the key may be used, for example, as the lighting means. Of course, not only the state just assumed in each case by the key may be indicated, but also the transition per se between the activated and inactivated state.

In a particular development, the key can be changed over to a cleared state, in which the transmission of the coded operating signal is released only for a limited period of time, up to a specific date, for a limited number of starting operations in the ignition lock or the like. After the period of time has elapsed, after the date has been reached, after the number of starting operations has been exhausted or the like, the key then changes over to the activated state automatically. Preferably, the programming of the data for the cleared state takes placed in the inactivated state, and, once again, the actuating members on the key may be used for entering the data. To determine to what extent the limited period of time has elapsed or the date for clearance has been reached, the key may possess a realtime clock.

As an aid for the user during programming of the key, it is appropriate to arrange on the housing an indicator, such as a display, light emitting diodes or the like, for displaying the entry of the individual code or the entry of the data for the cleared state. An indicator already located in the automobile, such as a display on the steering wheel, the instrument cluster in the instrument panel or the like, may also be used for this purpose, in which case the key is inserted into the ignition lock of the automobile in order to program the individual code or to program for clearance. With the aid of an indicator of this type in the automobile, guidance for the operator to enter data during programming can be achieved in a particularly simple way. If appropriate, actuating members assigned to the indicator may then also be used for entry, instead of the actuating members located on the housing of the key.

It is appropriate, furthermore, if required, to output on the indicator the other data stored in the key, in particular the remaining period of time or the remaining number of starting operations in the cleared state, the time of the realtime clock in the key, etc. Expediently, the realtime clock can be set via the indicator and transfer of the clock time of the instrument cluster into the key can be made possible during the changeover to the cleared state. Furthermore, the mode of the key, that is to say whether it is in the inactivated or activated state, may also be output on this indicator in the automobile.

When the key is in the ignition lock, the charge state of a battery serving for the intended operation of the key and located in the housing may be output at the same time in this indicator for checking purposes. If the charge state falls short of a certain limit, the user's attention is drawn to this by an alarm function. The charge state may also be output in this indicator for after battery-operated devices, for example for a mobile phone.

An advantage of the invention is that the user can secure the key individually against unauthorized use in a simple way. This individual securing comprises a simple additional programming of the key with a multidigit, in particular 2- or 3-digit individual numeric code or a language code. It is especially advantageous that this securing by programming the key may take place only in areas which are at risk, such as, for example, in a hotel, restaurant or the like, whilst the key may otherwise be used in the conventional way without this individual securing.

Even during travel, when the key is located in the ignition lock of the automobile, programming already used once may be activated again. This can take place in a simple way, for example, as a result of the protracted pressing of one of the actuating members on the key. So called "carjacking" can thereby be effectively prevented without any safety risk for the driver, since the thief subsequently finds that he can no longer use the key.

The key having the security function according to the invention is simple to handle. Thus, the buttons already present on the key may also be used for programming or activating and for cancelling or over-writing or for deactivating the individual coding. It is also possible to reuse or reactivate the already selected programming for the individual code by the repeated protracted pressing of an actuating member, for example by pressing the locking button 3 times.

It is also especially advantageous to use a display which is already present in the automobile, and which may be located, for example, in the instrument cluster, in order to indicate the data stored in the key, relating to the vehicle and driver and to the state of the key. User guidance for programming the key may also be provided on the display. In addition, the battery charge state of the key, said state being determined via an automatic test, may be indicated on the display. The ergonomics for the key can be enhanced even further thereby.

Since these additional functions for the key can also be performed by software, there is then no need for any additional parts on the key. A great increase in security at little extra cost is thus possible. Nonrecurring extra costs are incurred only in respect of a somewhat increased outlay in terms of software in the design or development phase, if the memory of the microcontroller in the key is not yet fully occupied.

An exemplary embodiment of the invention, along with various developments, is illustrated in the drawings and is described in more detail below.

DETAILED DESCRIPTION OF THE PREFERRED EMBODIMENTS

Figure 1:
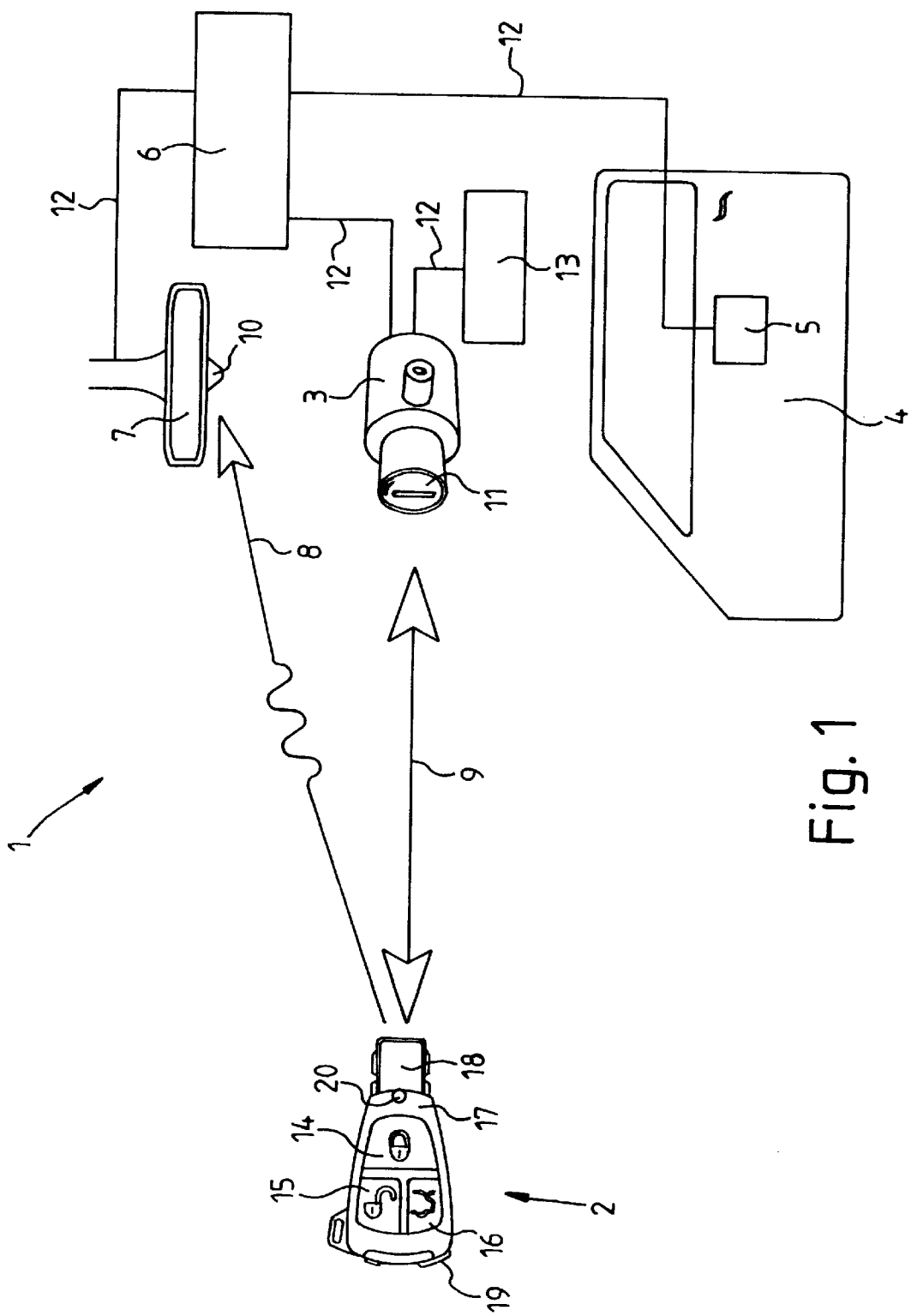
FIG. 1 shows diagrammatically a functional overview of a locking system in an automobile, said locking system being capable of being actuated by means of an electronic key.

FIG. 1 shows diagrammatically, in terms of some of its functions, a locking system 1 which is intended for an automobile. With the aid of an electronic key 2, the locking system 1 can be activated by remote control for access authorization, in the present case the automobile doors 4 and the automobile trunk lid, not shown in any more detail, can be locked and unlocked by remote control up to a certain maximum distance from the automobile, and, if appropriate, further functions on the automobile can also be triggered.

Actuating members 14, 15, 16 on the housing 17 of the key 2 serve for activating said functions and are actuated manually by the user. The actuating members 14, 15, 16 of the key 2 are designed as buttons and are provided with symbols which indicate the corresponding functions. In the present case, there are three buttons, specifically a locking button 14 for locking the automobile doors 4, an opening button 15 for unlocking the automobile doors 4 and a trunk button 16 for opening the trunk lid.

Means serving for the intended operation of the key 2 are arranged in the housing 17. These means, which are assigned to the front part 18 of the housing 17 and which are supplied with energy from a battery 33 or other energy source shown diagrammatically in FIG. 3 and located in the housing 17, are a transmitter 22 and, if appropriate, a receiver 23, which are to be seen in more detail in FIG. 2. A coded operating signal 8 can thereby be transmitted between the key 2 and a reception and transmission device 10 for the locking system 1, said device being arranged centrally in the automobile, for example on the interior mirror 7, the transmission of the operating signal 8 being triggerable by means of the actuating members 14, 15, 16. The transmitted operating signal 8 is fed to a signal processing device 6 located in the automobile, and, after positive evaluation of the operating signal 8, that is to say if the key 2 is authorized, a control unit 5, which is located, for example, in the respective automobile door 4 and which is connected to the signal processing device 6, for example via a bus system 12, such as the known CAN bus, is actuated in order to lock or unlock the automobile doors 4 or the trunk lid. The control unit 5 may be, for example, a central locking unit known per se.

Figure 2:
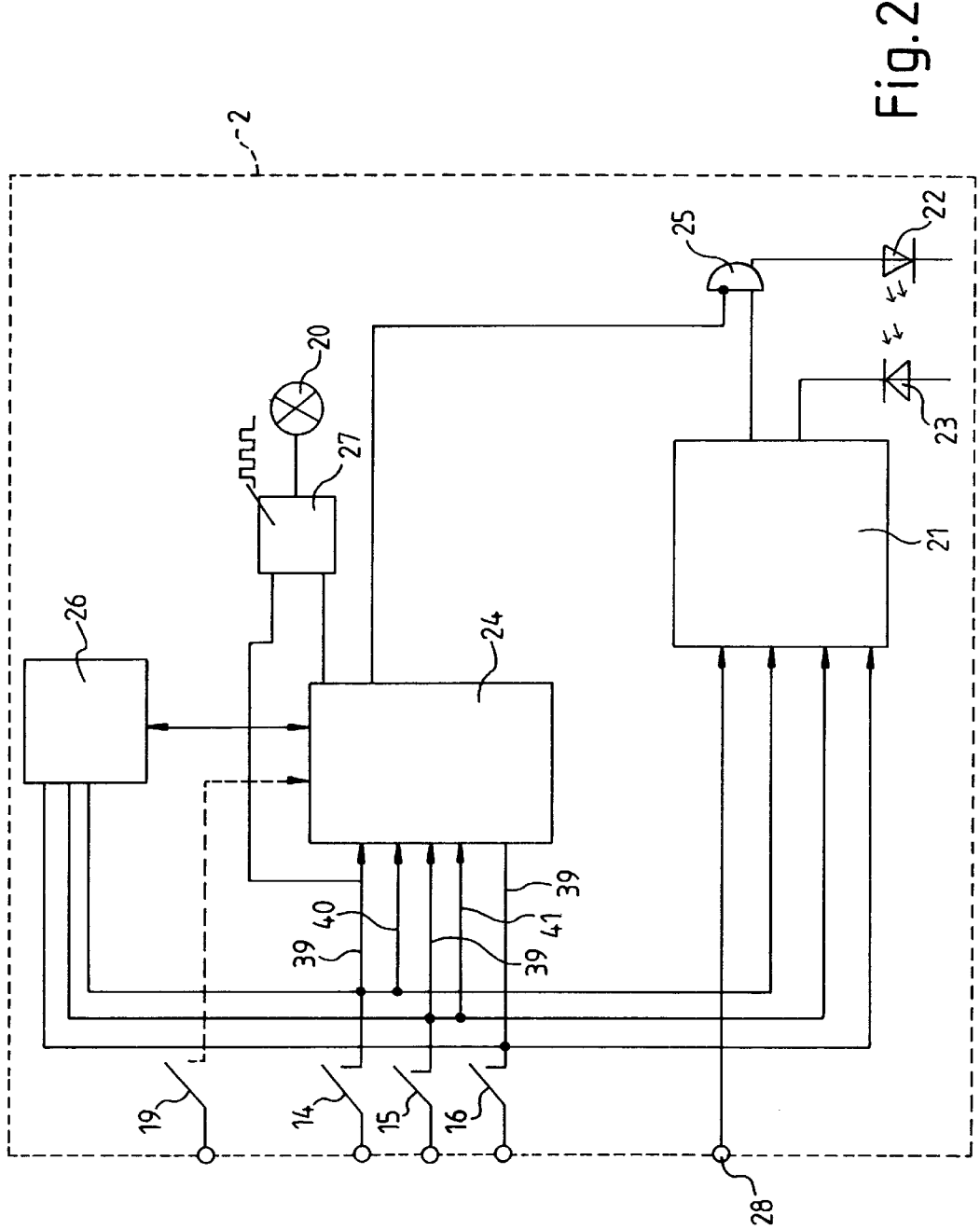
FIG. 2 shows a block diagram of the key.
Figure 3:
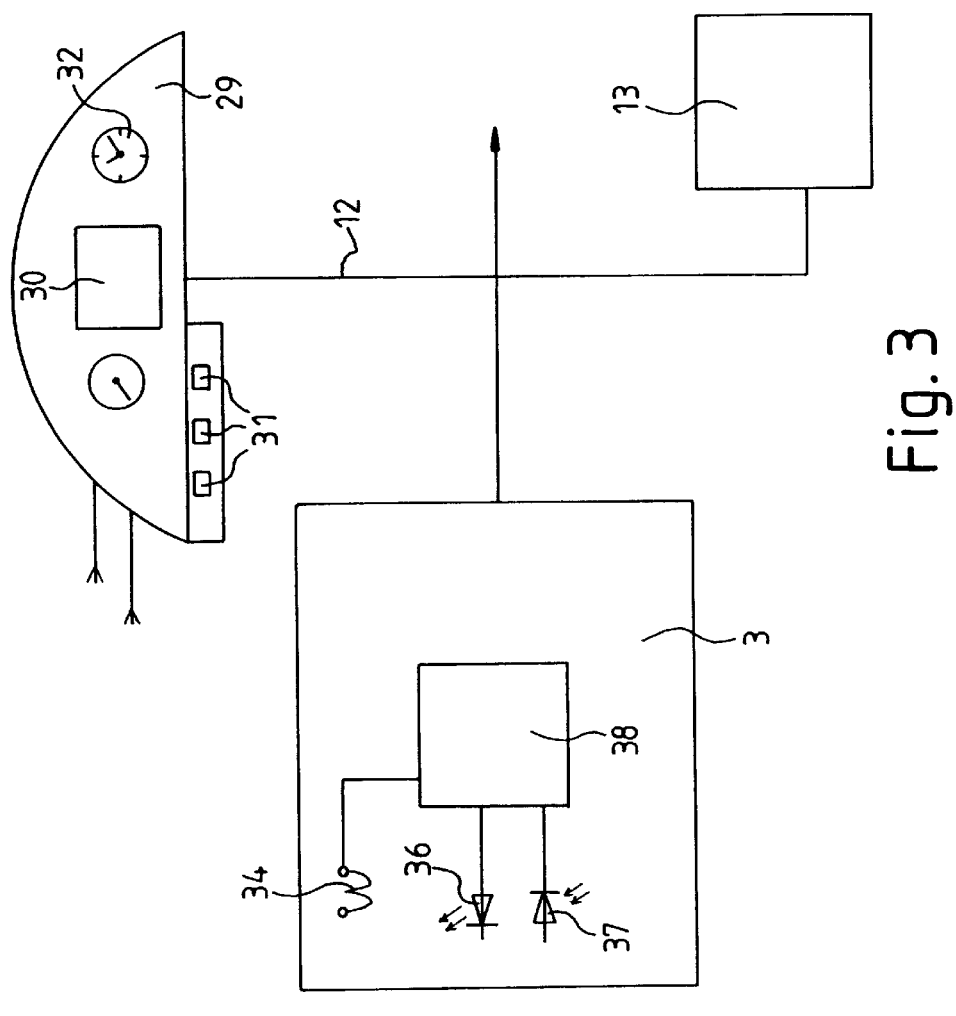
FIG. 3 shows a block diagram of the locking system of an automobile in a development.

In an additional function, the immobilizer of the automobile can be actuated by means of the electronic key 2. For this purpose, the locking system 1 possesses an electronic ignition lock 3 which is connected to an associated operating assembly 13. The operating assembly 13 may be, for example, the electronic engine control or the like of the automobile. After the key 2 has been inserted with its front part 18 in a receptacle 11 of the ignition lock 3, the key 2 is supplied with energy, via inductive means 34 in the ignition lock 3 and via corresponding inductive means 35 in the key 2, for the purpose of operating the circuit 21 of the key 2, as shown in FIG. 3. The exchange of at least one coded operating signal 9 between the key 2 and the ignition lock 3 subsequently takes place via a transmitter 22 and receiver 23 in the key 2 and a transmitter 36 and receiver 37 in the ignition lock 3. After positive evaluation of the operating signal 9, for which purpose a microcontroller 38 is arranged in the ignition lock 3 and the circuit 21 is arranged in the key 2, the ignition lock 3 is released and the operating assembly 13 can then be put into operation. FIG. 2 shows diagrammatically a block diagram of the functions of the key 2. The key 2 possesses a circuit 21 for generating the operating signals 8, 9 for access authorization and immobilization. The actuating members 14, 15, 16 are connected to the circuit 21, in order to trigger the generation of the corresponding operating signals 8, 9. Electromagnetic signals, such as HF signals and/or infrared signals or the like, are used, as a rule, as operating signals 8, 9 for the key 2. Where infrared signals are concerned, as shown by way of example in FIG. 2, an IR transmitting diode as the transmitter 22 and an IR receiving diode as the receiver 23 are connected to the circuit 21.

In order to improve theft protection, the electronic key 2 can be programmed with an additional individual code by the user, for which purpose a circuit 24 for programming is arranged in the key 2. The key 2 has an activated state, in which the transmission of the coded operating signal 8, 9 is blocked and, consequently, the intended operation of the key 2 is blocked. Furthermore, the key 2 has an inactivated state, in which the transmission of the coded operating signal 8, 9 is released, so that the key 2 can be operated as intended. As may be inferred from FIG. 2, the circuit 24 controls, via a gate 25, whether the transmission of the operating signal 8, 9 to the transmitter 22 is released according to the inactivated state or is blocked according to the activated state. The function of the gate 25 in the key 2 may, of course, also be performed by software.

The key 2 can be changed over between the activated and inactivated state, but a transition from the activated state to the inactivated state takes place only after the additional entry of the correct individual code on the key 2. Conversely, the individual code can be programmed during the transition from the inactivated to the activated state, preferably a previously programmed individual code being over-written. Instead of the reprogramming of the individual code, the reactivation of an already previously programmed individual code, in particular the individual code last programmed, may also be carried out, if the key 2 has already been programmed at least once with an individual code.

It is advantageous that the key 2 can be switched into the activated state according to the user's choice. The user therefore has freedom to decide to switch the key 2 into the activated state only when the latter is actually required. It may be appropriate, for example, to put the key 2 into the activated state in areas at risk, such as in hotels, restaurants or the like. On the other hand, for example, deactivation may be carried out, that is to say the key 2 is put into the inactivated state, when the key 2 is handed over in the workshop. The key 2 is then fully operable, without the workshop personnel having to be advised of the individual code.

A numeric code of the type of a PIN (Personal Identification Number) number is expediently used for the individual code. It is particularly appropriate, in this case, to use a three-digit numeric code as the individual code. The actuating members 14, 15, 16 located on the housing 17 are used for entering the individual code during the programming of the key 2, the corresponding digits in the numeric code being assigned in each case to an actuating member 14, 15, 16. For example, the first digit may be assigned to the locking button 14, the second digit to the opening button 15 and the third digit to the trunk button 16. The number of actuations of the associated actuating member 14, 15, 16 codes the respective digit. For example, actuating the locking button 14 five times codes the digit "five" in the first place of the individual code. If the respective actuating member 14, 15, 16 is not actuated, the digit "zero" is coded. More than nine actuations means an incorrect entry or, alternatively, the number of actuations is counted according to modulo 10. The entry of the respective digit is fed to the circuit 24 for programming via lines 39.

An additional actuating member 19, which may be designed as a button, is arranged on the housing 17 for the purpose of triggering the changeover between the activated and inactivated state. The actuation of the additional actuating member 19 by the user delivers a signal to the circuit 24 for programming. When the key 2 is in the activated state, the entry of the individual code is subsequently carried out via the actuating members 14, 15, 16 and this entry is checked by the circuit 24 as to whether the individual code is correct. Only when this is so does a changeover into the inactivated state take place, the circuit 24 releasing the transmission of the operating signal 8, 9 at the gate 25. If, on the other hand, the key 2 is in the inactivated state, a changeover into the activated state takes place and the user can then enter a new individual code into the circuit 24, or reactivate a previous individual code in the circuit 24, via the actuating members 14, 15, 16.

Alternatively, instead of an additional actuating member 19, the changeover between the activated and inactivated state may also be triggerable by means of one of the actuating members 14, 15, 16 themselves. In FIG. 2, the presence of an additional actuating member 19 is indicated, as an alternative, by depicting the connection between the additional actuating member 19 and the circuit 24 by dashes. Preferably, the locking button 14 is used, via the line 40, to change over to the activated state and the opening button 15 is used, via the line 41, to change over to the inactivated state. The changeover may likewise also be triggerable by actuating two of the three actuating members 14, 15, 16 simultaneously. The changeover otherwise takes place in a similar way to that described above. It is then appropriate, however, to provide a delay time for clearing the actuating members 14, 15, 16 for the entry of the individual code after the changeover command has been triggered, in order to rule out an inadvertent incorrect entry of the individual code. The elapse of the delay time and, consequently, readiness for the entry of the individual code may be indicated, for example, by a lighting means 20 lighting up on the housing 17.

As already mentioned, the reactivation of an already programmed old individual code may also be carried out during the changeover from the inactivated to the activated state. Such reactivation may take place, in particular, by the repeated interrupted actuation of an actuating member 14, 15, 16, for example by pressing the locking button 14 three separate times. This advantageously makes it unnecessary to enter the individual code during the programming of the key 2. Only when the user wishes to program a new individual code into the circuit 24 and, at the same time, overwrite the old individual code is a complete new entry then necessary.

Furthermore, it may also be expedient if, while the automobile is in the driving mode, the key 2 being inserted with its front part 18 in the ignition lock 2, the changeover to the activated state, with the old individual code being reactivated, can be carried out as a result of the protracted actuation of any desired actuating member 14, 15, 16. Consequently, if the automobile is attacked with the engine running, for example at a red traffic light, the key 2 can be inconspicuously rendered useless for future use. As soon as the thief switches off the engine, the vehicle can no longer be started, since the key 2 is then in the activated state.

In order to prevent the individual code from being discovered nevertheless by trial and error, a kind of antiplay device may be installed as a circuit 26 in the key 2. The circuit 26 cooperates with the circuit 24 for programming, in such a way that the activated state, with the coded operating signal 8, 9 being blocked, is then permanently set automatically when the incorrect individual code is entered several times. A stolen key 2 is then completely useless, even if the correct individual code is entered at a later time. It is then possible for this permanently set activated state to be deactivated only by authorized persons, for example in the workshop, where it is possible to reset the key 2 into the inactivated state by cancelling the old individual code with the aid of a special code which is assigned to the respective key 2 or automobile.

It may be expedient if the state of the key 2 is displayed to the user via an indicator on the housing 17. When the key 2 is in the activated state and one of the actuating members 14, 15, 16 is actuated or the key 2 is inserted into the ignition lock 3, this indicator can display to the user that the transmission of the operating signals 8, 9 is blocked. The user is thus advised that he must first carry out a changeover to the inactivated state by entering the individual code. This indication may be given, for example, by the high frequency flashing of the lighting means 20 on the housing 17, the lighting means 20 being activated for a certain time by a flashing circuit 27. It is appropriate to use the battery check light of the key 2 as the lighting means 20. The battery check light indicates the battery charge state as "in order" or "not in order", after a corresponding test during the actuation of one of the actuating members 14, 15, 16 is conducted. The lighting means 20 may also be designed as a light emitting diode which lights up red in the activated state and green in the inactivated state. The lighting means 20 may, of course, also display to the user that a changeover to the activated and/or inactivated state of the key 2 has taken place.

In order to simplify the programming of the key 2, an indicator for displaying the entry of the individual code may additionally be arranged on the housing. The indicator may be a display which indicates the digit entered in each case. However, it may also be sufficient to use one light emitting diode, which may be the lighting means 20, or else a plurality of light emitting diodes or the like. Whenever the actuating member 14, 15, 16 is actuated in order to enter the respective digit of the individual code, the lighting means 20 then lights up, so that the user can, by counting at the same time, ascertain the digit entered in each case.

It may also be appropriate, for displaying the entry during the programming of the individual code or the state which the key 2 assumes, to use an indicator located in the automobile, such as a display on the steering wheel, in the instrument cluster on the instrument panel or at another location in the automobile. A development of this type is shown in FIG. 3, where the instrument cluster 29 is connected to the ignition lock 3 via the bus system 12 and a display 30 is located in the instrument cluster 29.

For programming the individual code, the key 2 is inserted into the ignition lock 3 of the automobile. The individual code entered during programming is then output in the display 30 in the automobile and, if appropriate, may still be corrected. At the same time, corresponding operator guidance may also take place in plain text or by means of symbols on the display 30. If appropriate, it may then be expedient to use actuating members 31 assigned to the display 30 for entry during programming, instead of the actuating members 14, 15, 16 located on the key 2.

Instead of a numeric code for the individual code, linguistic enciphering is also conceivable as a code. As also shown alternatively in FIG. 3, a circuit 42 for speech recognition is connected to the circuit 21 for generating the operating signals 8, 9. The circuit 42 may be located in the key 2 itself or else in the automobile, for example connected to the instrument cluster 29, for which reason the connecting line 44 between the circuit 42 and the circuit 21 is depicted by dashes. A microphone 43 is connected to the circuit 42, so that the individual code can be entered vocally by the user. Speech recognition may take place in a speaker-dependent or else speaker-independent manner, in particular the commands "activate" or "inactivate" can be entered by the user via the microphone 43.

In another embodiment, the electronic key 2 can be changed over to a further state. In this further state, the transmission of the coded operating signal 8, 9 is released only for a limited period of time, so that this further state is designated below as a cleared state. After the period of time has elapsed, the key 2 then changes over to the activated state automatically. The owner of the key 2 can thereby prevent the possibility of the automobile being used by a third party beyond the limited period of time, which may be appropriate, in particular, if the automobile is leased or rented. Only the owner, due to his knowledge of the individual code, can thereafter switch the key 2 into the inactivated state again.

The cleared state may likewise be characterized by other data, for example release may take place up to a specific date, for a limited number of starting operations in the ignition lock 3 or the like. The key 2 then changes over to the activated state after this date is reached or after the number of starting operations is exhausted.

The programming of the data for the cleared state is carried out in the inactivated state. The actuating members 14, 15, 16 on the key 2 may serve, once again, for entering these data. If a limited period of time is to be entered, the locking button 14 may be used for example for the number of hours, the opening button 15 for the days and the trunk button 16 for the months of the period of time.

As already explained in more detail with regard to the individual code, an indicator device on the housing 17 of the key 2 or a display 30, shown in FIG. 3, in the automobile may serve for displaying the data for the cleared state, that is to say, for example, the remaining duration of clearance or the number of remaining starting operations, and for operator guidance during the programming of the key 2 for clearance. Of course, other data stored in the key 2 may also be capable of being indicated by the display 30, as soon as the key 2 is inserted into the ignition lock 3. These other data may be, for example, driver and vehicle data stored in the key 2. In particular, which driver is assigned the key 2 may be indicated. With the aid of the stored driver data, for example, a mirror and seat adjustment or the like assigned to the respective driver may be carried out in the automobile.

A realtime clock for determining to what extent the limited period of time has elapsed or the date has been reached is located in the key 2. The respective clock time of the realtime clock can then be indicated, and also set, in the display 30 in the instrument cluster 29. It is expediently possible for the clock time of the clock 32 located in the instrument cluster 29 to be transferred into the key 2 during the changeover to the cleared state.

Furthermore, the charge state of the battery 33 or other energy source, which serves for the intended operation of the key 2 and is located in the housing 17 and which supplies the circuits 21, 24, 26, 27, etc. in the key 2 with voltage via a terminal 28, may also be checked by means of an automatic test and be output on this indicator 30 in the automobile, so as to serve as a check for the user. Monitoring of this voltage then triggers, for example, a warning to the driver when the battery 33 only has a low charge. Of course, the charge state may also be monitored, and output on the indicator 30, for further battery-operated consumers in the automobile, such as mobile phones or the like.

The invention is not restricted to the exemplary embodiment described and illustrated. On the contrary, it also embraces all developments within the scope of the inventive idea which are open to the average person skilled in the art. Thus, the invention may be used not only in the case of keys for automobiles, but also on keys for house doors, garage doors or the like provided with electronic locks. The invention can also be employed on remote controls, for example for television sets or the like.

What is claimed is:

1. An electronic key for use with a vehicle locking system for controlling at least one of a door locking feature and an ignition lock feature on the vehicle, the electronic key comprising:

a transmitter/receiver for transmitting at least one coded operating signal generated by the electronic key from the electronic key to the locking system to trigger at least one of the door locking and ignition lock features of the locking system upon positive evaluation of the transmitted coded operating signal by the locking system;

actuating members operable by the user to cause the transmitter/receiver to transmit the coded operating signal, the actuating members corresponding respectively to one of the door locking and ignition lock features and being operable by the user to enter an individual code; and a circuit for receiving an individual code entered by said actuating members and comparing it with a programmed individual code and, upon entry of the programmed individual code changing the key over from a first, activated state in which transmission of the coded operating signal is prevented to a second, inactivated state in which transmission of the coded operating signal is permitted.

2. The electronic key as claimed in claim 1, and further comprising a housing in which the transmitter/receiver and the circuit are disposed, wherein the actuating members are located on the housing and comprise a locking button for locking doors on the vehicle, an opening button for unlocking doors on the vehicle, and a trunk button for opening a trunk of the vehicle.

3. The electronic key as claimed in claim 2, wherein during the transition from the inactivated into the activated state, the circuit accepts a programming of the individual code input via operation of at least one of the actuating members.

4. The electronic key as claimed in claim 2, wherein during the transition from the inactivated to the activated state, the circuit accepts reactivation of an already programmed individual code via operation of at least one of the actuating members.

5. The electronic key as claimed in claim 3, wherein the individual code programmed comprises a numeric code, and the actuating members are each assigned corresponding digits in the numeric code and the number of actuations of the actuating members increments each respective digit.

6. The electronic key as claimed in claim 1, wherein activation of at least one of the actuating members triggers a changeover command to change the key for the active state to the inactive state, and after the changeover command has been entered, a delay time for the entry of the individual code is started and the elapse of the delay time is indicated by a display on the housing.

7. The electronic key as claimed in claim 1, further comprising an additional actuating member comprising a button located on the housing for triggering a changeover command to change the key between the activated and inactivated state.

8. The electronic key as claimed in claim 2, wherein a changeover from the inactivated state to the activated state is triggered by pressing the locking button or by pressing two actuating members simultaneously, and wherein the changeover from the activated state to the inactivated state is triggered by the opening button.

9. The electronic key as claimed in claim 1, wherein repeated interrupted actuation of any one of the actuating members causes reprogramming of an already programmed individual code, and wherein protracted actuation of any one of the actuating members during a driving mode of the vehicle causes reactivation of an already programmed individual code, and wherein when an incorrect individual code is entered several times during the activated state, the coded operating signal is permanently blocked until the entry of a master code.

10. The electronic key as claimed in claim 1, further comprising an indicator for indicating at least one of the activated state, the inactivated state and a changeover between the activated and inactivated states.

11. The electronic key as claimed in claim 10, wherein the indicator comprises a high frequency flashing of a battery check light on the housing.

12. The electronic key as claimed in claim 10, wherein the indicator comprises a light emitting diode on the housing which lights up red in the activated state and green in the inactivated state.

13. The electronic key as claimed in claim 1, wherein the key is changed over to a cleared state, in which the transmission of the coded operating signal is released only for a limited period of time, until the occurrence of a specific date, or for a limited number of starting operations, and the key changes over to the activated state automatically after the elapse of the period of time, the occurrence of the date, or the number of starting operations has occurred.

14. The electronic key as claimed in claim 13, wherein the actuating members on the key enter time, date or number data for the cleared state and wherein the key comprises a clock for determining when the limited period of time or the specific date has been reached.

15. The electronic key as claimed in claim 14, wherein the actuating members comprise a locking button for locking doors on the vehicle, an opening button for unlocking doors on the vehicle, and a trunk button for opening a trunk of the vehicle, and wherein the locking button is used to enter hours, the opening button is used to enter days, and the trunk button is used for entering months.

16. The electronic key as claimed in claim 1, wherein an indicator is arranged on the housing for displaying at least one of entry of the individual code, operator guidance during programming, or data associated with the cleared state.

17. The electronic key as claimed in claim 1, further comprising means for communicating with an indicator located in the vehicle that displays at least one of the entry of individual code, operator guidance during programming of the key, or data associated with the cleared state when the key is inserted into the ignition lock of the vehicle, and further comprising additional actuating members associated with the indicator for programming the key, and wherein the charged state of the battery of the key is monitored on the indicator.

18. The electronic key as claimed in claim 17, wherein the key comprises a real time clock, which communicates with a clock in the vehicle.

* * * * *